US006946493B2

(12) United States Patent
Mohedas et al.

(10) Patent No.: US 6,946,493 B2
(45) Date of Patent: Sep. 20, 2005

(54) MANAGING HYDROGEN IN A GAS TO LIQUID PLANT

(75) Inventors: Sergio R. Mohedas, Ponca City, OK (US); Stephen R. Landis, Katy, TX (US); Rafael L. Espinoza, Ponca City, OK (US); Ralph T. Goodwin, III, Ponca City, OK (US); Barbara A. Belt, Seabrook, TX (US)

(73) Assignee: ConocoPhillips Company, Houston, TX (US)

(*) Notice: Subject to any disclaimer, the term of this patent is extended or adjusted under 35 U.S.C. 154(b) by 253 days.

(21) Appl. No.: 10/388,884

(22) Filed: Mar. 15, 2003

(65) Prior Publication Data

US 2004/0181313 A1 Sep. 16, 2004

(51) Int. Cl.$^7$ .............................................. C07C 27/00
(52) U.S. Cl. ...................... 518/700; 518/702; 518/703; 518/704; 518/705; 518/706; 518/709; 518/726
(58) Field of Search ................................ 518/700, 702, 518/704, 705, 706, 709, 726, 703

(56) References Cited

U.S. PATENT DOCUMENTS

| | | | |
|---|---|---|---|
| 3,702,886 A | 11/1972 | Argauer et al. | 423/328 |
| RE29,948 E | 3/1979 | Dwyer et al. | 208/110 |
| 5,431,855 A | 7/1995 | Green et al. | 252/373 |
| 5,500,149 A | 3/1996 | Green et al. | 252/373 |
| 5,628,931 A | 5/1997 | Lednor et al. | 252/373 |
| 5,654,491 A | 8/1997 | Goetsch et al. | 568/469.9 |
| 5,888,470 A | 3/1999 | Engler et al. | 423/650 |
| 5,925,799 A | 7/1999 | Stanley et al. | 585/259 |
| 5,980,596 A | 11/1999 | Hershkowitz et al. | 48/127.9 |
| 6,043,288 A * | 3/2000 | DeGeorge et al. | 518/715 |
| 6,072,097 A | 6/2000 | Yokoyama et al. | 585/658 |
| 6,143,202 A | 11/2000 | Christensen et al. | 252/373 |
| 6,147,126 A | 11/2000 | DeGeorge et al. | 518/715 |
| 6,156,809 A | 12/2000 | Clark et al. | 518/719 |
| 6,402,989 B1 | 6/2002 | Gaffney | 252/373 |
| 6,409,940 B1 | 6/2002 | Gaffney et al. | 252/373 |
| 6,512,018 B2 | 1/2003 | Kennedy | 518/715 |
| 2001/0027220 A1 * | 10/2001 | Kennedy | 518/702 |
| 2002/0006374 A1 | 1/2002 | Kourtakis et al. | 423/418.2 |
| 2002/0009407 A1 | 1/2002 | Kourtakis et al. | 423/418.2 |
| 2002/0032244 A1 | 3/2002 | Benham et al. | 518/715 |
| 2003/0040655 A1 | 2/2003 | Budin et al. | 585/627 |

FOREIGN PATENT DOCUMENTS

| | | |
|---|---|---|
| DE | 3345064 A1 | 6/1985 |
| DE | 3345088 A1 | 6/1985 |
| EP | 0269297 A1 | 6/1988 |
| EP | 1188713 A2 | 3/2002 |
| WO | WO 00/43336 | 1/2000 |
| WO | WO 0009441 | 2/2000 |
| WO | WO 0142175 A1 | 6/2001 |
| WO | WO 02/020395 | 3/2002 |
| WO | 03/057652 A1 * | 7/2003 |

OTHER PUBLICATIONS

International Search Report (PCT/US2004/007912), Aug. 23, 2004, 5 pages.
International Search Report (PCT/US2004/007913), Aug. 16, 2004, 4 pages.
International Search Report (PCT/US2004/007914), Aug. 16, 2004, 4 pages.

* cited by examiner

Primary Examiner—J. Parsa
(74) Attorney, Agent, or Firm—Conley Rose P.C.

(57) ABSTRACT

The present invention provides a process for managing hydrogen in a hydrocarbon gas to liquid plant. The process includes feeding a syngas stream produced by a partial oxidation reactor to a Fischer-Tropsch reactor, thereby converting the syngas to hydrocarbon liquids. It also includes passing a substantially oxygen-free feed stream comprising hydrocarbon gas and water to a steam reformer, thereby producing a hydrogen-rich stream. The $H_2/CO$ ratio in the syngas feed stream can be adjusted to a desired value by introducing a first portion of the hydrogen-rich stream to the syngas feed stream. A second portion of the hydrogen-rich stream can be passed to one or more hydrogen users, e.g., a catalyst regeneration unit, in the GTL plant.

21 Claims, 2 Drawing Sheets

MANAGING HYDROGEN IN A GAS TO LIQUID PLANT

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

This invention generally relates to the production of hydrocarbons. More specifically, the invention relates to a process for managing hydrogen in a gas to liquid (GTL) plant.

BACKGROUND OF THE INVENTION

Large quantities of natural gas are available in many areas of the world, and natural gas is predicted to outlast oil reserves by a significant margin. However, natural gas reserves have been found in remote areas where it is uneconomical to develop the reserves due to the lack of local markets for the gas and the high cost of transporting the gas to distant markets. This high cost is often related to the extremely low temperatures needed to liquefy the highly volatile gas during transport. An alternative is to locally convert the natural gas to liquid hydrocarbon products that can be transported more cost effectively. Processes for converting light hydrocarbon gases, such as natural gas, to heavier hydrocarbon liquids are generally known in the art.

One such process, commonly known as gas to liquids (GTL) production, involves the conversion of natural gas to synthesis gas (syngas) comprising hydrogen ($H_2$) and carbon monoxide (CO), followed by feeding the syngas to a Fisher-Tropsch (FT) process for conversion to primarily $C_5^+$ hydrocarbons via a Fischer-Tropsch reaction. The GTL production includes process steps that consume hydrogen. It would be desirable to achieve optimization of the GTL production by managing hydrogen production and distribution. Managing hydrogen generated from natural gas or from other sources in accordance with the present invention provides for optimization of the FT process and the overall GTL production plant and increases process flexibility and reliability.

SUMMARY OF THE INVENTION

According to an embodiment, a process for managing hydrogen in a hydrocarbon gas to liquid plant provides for the optimization of the GTL plant. The process includes passing a syngas feed stream produced preferably by a partial oxidation reactor to a Fischer-Tropsch synthesis reactor, thereby converting the syngas to hydrocarbons and water. Hydrocarbon synthesis reactors produce hydrocarbons which may be paraffinic hydrocarbons (saturated hydrocarbons), olefinic hydrocarbons (unsaturated hydrocarbons), oxygenates (oxygen-containing compounds), or any combination thereof. The process also includes passing a feed stream comprising hydrocarbon gas and water to a steam reformer to produce a hydrogen-rich stream. The feed stream to the steam reformer is substantially oxygen-free, meaning that the stream is substantially free of molecular oxygen ($O_2$) and/or ozone. Optionally, a portion of the hydrogen-rich stream is then subjected to a water gas shift (WGS) reaction to produce an enriched hydrogen-rich stream.

Optionally, a first portion of the enriched hydrogen-rich stream is sent to a $CO_2$ removal process before being introduced to the syngas feed stream to adjust the hydrogen to carbon monoxide ($H_2/CO$) ratio of the syngas stream to a desired value. Another portion of the hydrogen-rich stream and optionally a second portion of the enriched hydrogen-rich stream may be subjected to a separation process to further concentrate the hydrogen in the stream, followed by passing the concentrated hydrogen rich stream to one or more hydrogen users in the GTL plant. The hydrogen users are, for example, a process for stripping water from a slurry recovered from the FT reactor, a process for regenerating a Fischer-Tropsch catalyst, and a process for upgrading or refining the hydrocarbons recovered from the FT reactor into hydrocarbon products, where hydrocarbon products refers to materials that can be used as components of at least one of naphtha, diesel, kerosene, jet fuel, lube oil and wax, which are mixtures known in the art.

DESCRIPTION OF THE DRAWINGS

The invention, together with further advantages thereof, may best be understood by reference to the following description taken in conjunction with the accompanying drawings in which.

DETAILED DESCRIPTION OF THE PREFERRED EMBODIMENTS

Figure 1:
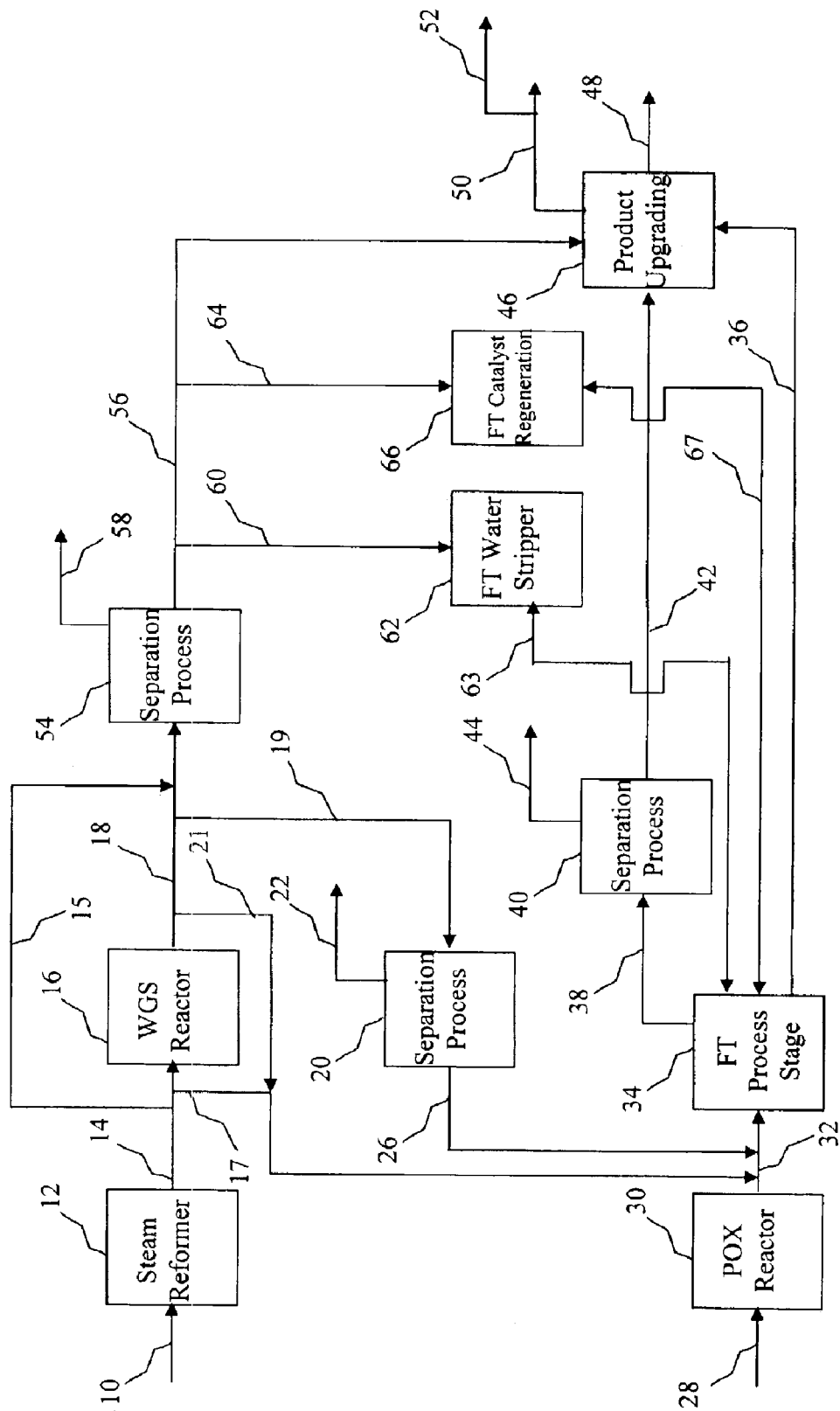
FIG. 1 is a block flow diagram of a hydrocarbon gas to liquid plant in accordance with the present invention, wherein hydrogen is produced by a steam reformer for use in adjusting the $H_2/CO$ ratio of a feed stream to a Fischer-Tropsch reactor and in supplying various hydrogen users in the gas to liquid plant.

In the embodiment shown in FIG. 1, a hydrogen rich stream is introduced to a feed stream of a FT process stage. As used herein, process stage refers to a process stage comprising one or more reactors, typically arranged in parallel, wherein a given conversion of syngas to hydrocarbons is achieved. In a multi-stage process, a plurality of process stages are arranged in series such that a subsequent or downstream stage receives unreacted reactants (e.g., syngas) and at least a portion of the products from a prior or upstream stage and further converts the unreacted reactants to hydrocarbons, thereby increasing the overall percent conversion of reactants as they pass from stage to stage until a final desired conversion percentage is obtained. Furthermore, reaction conditions typically vary from stage to stage, and the present invention addresses managing hydrogen in the feed to optimize operation of a multi-stage process. In alternative embodiments, the number of process stages may be optimized based on the desired throughput of the process. As shown in FIG. 1, the hydrogen rich stream mentioned above may be produced by first passing a substantially oxygen-free feed stream 10 comprising steam ($H_2O$) and one or more low molecular weight paraffinic hydrocarbons to a steam reformer 12. The low molecular weight paraffinic hydrocarbon may be obtained from any available source. In preferred embodiments, feed stream 10 comprises a mixture of methane ($CH_4$) recovered from a gas plant for processing natural gas and steam. Any known configuration may be employed for steam reformer 12. For example, a steam reformer typically contains catalyst-filled tubes housed in a furnace. Steam reformer 12 contains any suitable catalyst and is operated at any suitable conditions effective to promote the conversion of a hydrocarbon and steam to hydrogen ($H_2$) and carbon monoxide (CO). In the case where the hydrocarbon is methane, steam methane reforming (SMR) proceeds by the following endothermic reaction:

$$CH_4 + H_2O \rightarrow 3H_2 + CO$$

The catalyst employed for the steam reforming process preferably comprises one or more catalytically active components such as palladium, platinum, rhodium, iridium, osmium, ruthenium, nickel, chromium, cobalt, cerium, lanthanum, or mixtures thereof. The catalytically active component may be disposed on a catalyst support such as a ceramic pellet. The steam reforming process is preferably performed at a high temperature in the range of about 600° C. to about 1,100° C. and more preferably in the range of about 800° C. to about 1,100° C. It is also preferably performed at a high pressure of from about 5 atm to about 30 atm.

The effluent stream 14 recovered from steam reformer 12 contains $H_2$, CO, unreacted $CH_4$ (or other hydrocarbon), and unreacted $H_2O$. Optionally, in a preferred embodiment, effluent stream 14 is passed to a water gas shift (WGS) reactor 16 to convert at least a portion of the CO contained therein to carbon dioxide ($CO_2$) and $H_2$ in the presence of a catalyst. The WGS reaction proceeds according to the following exothermic reaction:

$$CO + H_2O \rightarrow CO_2 + H_2$$

The WGS reactor 16 is preferably operated at a temperature in the range of from about 200° C. to about 1100° C., more preferably from about 200° C. to about 450° C. The temperature selected depends on the WGS catalyst composition, the amount of conversion desired, and the temperature of the incoming reactant gases. Typically, the lower the temperature, the higher the concentration of $H_2$ at equilibrium conditions. The WGS reactor can also be operated at a pressure in the range of from about 1 atmosphere to about 300 atmospheres. Any known catalyst suitable for promoting the WGS reaction may be disposed in the WGS reactor. Examples of such catalysts include, but are not limited to, iron based catalysts such as $Fe_3O_4/Cr_2O_3$ and copper based catalysts such as $CuO/ZnO/Al_2O_3$. The Cu based catalysts are low temperature type catalysts but tend to be unstable. The preferred operation temperature range for Cu based catalysts is from 180° C. to about 260° C. Above that range, the catalysts start to deactivate due to sintering of the active component, Cu. The Fe based catalysts are very stable but have lower activities that require higher temperatures. The preferred operation temperature range for Fe based catalysts is from about 300° C. to about 550° C.

An enriched hydrogen-rich stream 18 primarily comprising $H_2$ exits WGS reactor 16. Enriched hydrogen-rich stream 18 also comprises $CO_2$ and the unreacted reactants of the steam reforming and WGS processes. In a preferred embodiment, at least a portion of stream 18, i.e., stream 19, is then passed to a separation process 20 for removing the $CO_2$ from slip stream 19, as indicated by stream 22, thereby forming a stream 26 with a higher hydrogen concentration than stream 18. Separation process 20 may be based on an amine system for removing $CO_2$ from stream 19. Also, separation process 20 may include, for example, a pressure swing adsorption (PSA) unit. Stream 26 may be introduced to syngas stream 32, which is being fed to FT process stage 34. More details related to this introduction of stream 26 can be found later in the specification.

In addition, a portion of effluent stream 14, i.e., slipstream 15, from stream reformer 12 may be introduced to enriched hydrogen-rich stream 18, followed by passing a portion of enriched hydrogen-rich stream 18 to a separation process 54 to produce a second hydrogen-rich stream 56 primarily containing $H_2$ and a hydrogen lean stream 58 primarily containing gases other than $H_2$. Separation process 54 includes, for example, a PSA unit or a membrane separation unit. Second hydrogen-rich stream 56 comprises greater than about 80% by volume $H_2$ per total weight of the stream, preferably greater than about 85% by volume $H_2$, and more preferably greater than about 90% by volume $H_2$. Hydrogen lean stream 58 can be used to meet various fuel needs in the GTL plant. Although not shown, hydrogen lean stream 58 may be used as fuel in various units of the GTL plant such as pre-heaters and gas turbines. Examples of suitable preheaters are an FT process pre-heater, a fractionator column pre-heater, and an FT product upgrading pre-heater. An example of a gas turbine is one that is employed to generate electricity for the GTL plant.

FIG. 1 also depicts an FT process in which a feed stream 28 comprising a mixture of at least one hydrocarbon and oxygen ($O_2$) is passed to a catalytic partial oxidation (CPOX) reactor 30. Feed stream 28 preferably comprises primarily $C_1$ to $C_5$ hydrocarbons, preferably at least 50% methane, and more preferably at least 80% methane, that has been separated from other components of a natural gas stream in a gas plant (not shown). The oxygen contained within feed stream 28 is preferably pure oxygen; however, feed stream 28 may alternatively comprise another source of oxygen, e.g., air, oxygen-enriched air, oxygen mixed with an inert gas (i.e., a diluent), and so forth. The gases in feed stream 28 are typically pre-heated, mixed, and passed over or through a catalyst bed disposed within CPOX reactor 30, which preferably is a short-contact time reactor (SCTR) such as a millisecond contact time reactor. Suitable SCTR's are described in U.S. Pat. Nos. 6,409,940 and 6,402,989. The methane (or other hydrocarbon) and the oxygen contained in feed stream 28 are converted to syngas upon contact with the catalyst bed. Partial oxidation of methane proceeds by the following exothermic reaction:

$$2CH_4 + O_2 \rightarrow 2CO + 4H_2$$

CPOX reactor 30 contains any suitable partial oxidation catalyst for promoting the partial oxidation of methane (or other hydrocarbon) to syngas. Partial oxidation catalysts are well known to those skilled in the art. Partial oxidation catalysts typically comprise a catalytically active metal on a support structure. Exemplary catalytically active metals include palladium, platinum, rhodium, iridium, osmium, ruthenium, nickel, chromium, cobalt, cerium, lanthanum, and mixtures thereof. The support structure often dictates the type of catalyst bed that may be used. For example, fixed beds typically comprise monoliths and large particle sized supports, and small particle sized supports tend to be more useful in fluidized beds.

Within CPOX reactor 30, feed stream 28 is contacted with the catalyst in a reaction zone that is maintained at conversion-promoting conditions effective to produce $H_2$ and CO. Preferably, CPOX reactor 30 is operated at relatively mild conditions to avoid the formation of unwanted by-products. Suitable partial oxidation processes, conditions, and catalysts for use with the present invention are disclosed in, for example, U.S. Pat. Nos. 6,402,989 and 6,409,940; published PCT application WO 02/20395; and published U.S. Pat. Applications 2002-0006374 and 2002-0009407, each of which is incorporated herein by reference in its entirety. A syngas stream 32 primarily comprising $H_2$ and CO is recovered from POX reactor 30. Oxygen, carbon dioxide, water, and light hydrocarbons may also be present in syngas stream 32.

The syngas stream 32 is fed to an FT process stage 34 for conversion to hydrocarbons. Alternatively, syngas stream 32 may be fed to a multi-stage process comprising two or more FT process stages in series. The feed gases charged to the FT process comprise hydrogen, or a hydrogen source, and carbon monoxide. Preferably, the hydrogen is provided by free hydrogen, although some Fischer-Tropsch catalysts have sufficient water gas shift activity to convert some water and carbon monoxide to carbon dioxide and hydrogen for use in the FT process. It is preferred that the molar ratio of hydrogen to carbon monoxide in syngas stream 32 be greater than 0.5:1 (e.g., from about 0.67:1 to about 2.5:1). Preferably, when cobalt, nickel, and/or ruthenium catalysts are used for the FT synthesis, syngas stream 32 contains hydrogen and carbon monoxide in a molar ratio of from about 1.6:1 to about 2.3:1. Preferably, when iron catalysts are used, syngas stream 32 contains hydrogen and carbon monoxide in a molar ratio of from about 1.4:1 to about 2.3:1. Syngas stream 32 may also contain carbon dioxide. Further, syngas stream 32 should contain only a low concentration of compounds or elements that have a deleterious effect on the catalyst such as poisons. For example, syngas stream 32 may need to be pretreated to ensure that it contains low concentrations of sulfur or nitrogen compounds such as hydrogen sulfide, hydrogen cyanide, ammonia, and carbonyl sulfides.

In a preferred embodiment, at least one of: concentrated hydrogen-rich stream 26, a portion of effluent stream 14 (i.e., slipstream 17), and a portion of enriched hydrogen-rich stream 18 (i.e., slipstream 21) or combinations thereof, each of which contains $H_2$ produced by steam reformer 12, is introduced to syngas feed stream 32 to adjust the $H_2$ content therein (i.e., increase the $H_2$/CO ratio). The $H_2$/CO ratio in syngas feed stream 32 is adjusted to a value preferably in the range of from about 1.5 to about 3.0, more preferably from about 1.7 to about 2.4, this value being dependant on the type of catalyst and process conditions utilized in the FT process. For a multistage process, and for a $H_2$/CO ratio in the feed lower than the stoichiometric ratio, the $H_2$/CO ratio drops with each successive pass through each process stage. In this case, at at least one of stream 26, slipstream 17, and slipstream 21 or combinations thereof can be introduced to the feed stream of each process stage for the purpose of raising the $H_2$/CO ratio therein.

Any suitable catalyst for promoting the conversion of $H_2$ and CO to hydrocarbons may be employed for FT process stage 34. The FT catalyst includes an active catalyst component either unsupported or supported on a material. The support material (also known as the catalyst support) may be a porous material that provides mechanical support for the active catalyst component. Examples of suitable support materials include boehmite and refractory oxides such as silica, alumina, titania, thoria, zirconia, or mixtures thereof such as silica-alumina. Other examples of suitable support materials are aluminum fluorides and fluoridated alumina. The active catalyst component comprises at least one metal from Groups 8, 9, or 10 of the Periodic Table (based on the new IUPAC notation). Preferably, the active catalyst component is iron, cobalt, nickel, ruthenium, or mixtures thereof. The amount of active catalyst component present in the catalyst may vary. For instance, the unsupported catalyst may comprise up to about 90% by weight of the active metal per total weight of the catalyst. The supported catalyst may comprise about 1 to 50% by weight of the metal component per total weight of the metal component and support material, preferably from about 5 to 40% by weight, and more preferably from about 10 to 35% by weight. In addition, the FT catalyst may also comprise one or more promoters known to those skilled in the art. Suitable promoters include Group 1 metals, Group 2 metals, Group 3 metals, Group 4 metals, Group 5 metals, and Group 11 metals. Typically, at least a portion of the metal is present in a reduced state (i.e., in the metallic state). Therefore, the FT catalyst is preferably activated prior to use by a reduction treatment.

During the FT conversion process, each FT reaction zone is maintained at conversion-promoting conditions effective to produce the desired hydrocarbons. The Fischer-Tropsch process is typically run in a continuous mode. In this mode, the gas hourly space velocity through the reaction zone typically may range from about 50 $hr^{-1}$ to about 10,000 $hr^{-1}$, preferably from about 300 $hr^{-1}$ to about 2,000 $hr^{-1}$. The gas hourly space velocity is defined as the volume of reactants per time per reaction zone volume. The volume of reactant gases is at standard conditions of pressure (1 atm or 101 kPa) and temperature (0° C. or 273.16 K). The reaction zone volume is defined by the portion of the reaction vessel volume where reaction takes place and which is occupied by a gaseous phase comprising reactants, products, and/or inerts; a liquid phase comprising liquid/wax products and/or other liquids; and a solid phase comprising catalyst. The reaction zone temperature is typically in the range from about 160° C. to about 300° C. Preferably, the reaction zone is operated at temperatures of from about 190° C. to about 260° C. The reaction zone pressure is typically in the range of about 80 psia (552 kPa) to about 1000 psia (6895 kPa), more preferably from about 80 psia (552 kPa) to about 600 psia (4137 kPa), and still more preferably from about 140 psia (965 kPa) to about 500 psia (3447 kPa).

Any suitable reactor configuration or mechanical arrangement that allows contact between the syngas and the FT catalyst may be employed for the one or more FT reactors in FT process stage 34. Examples of suitable FT reactors include slurry-bubble reactors, fixed bed reactors such as tubular reactors, and multiphase reactors with a stationary catalyst phase. In a slurry-bubble reactor, the FT catalyst particles are suspended in a liquid, e.g., molten hydrocarbon wax, by the motion of bubbles of syngas sparged into the bottom of the reactor. As the gas bubbles rise through the reactor, the syngas is absorbed into the liquid where it diffuses to the catalyst for conversion to hydrocarbons. Gaseous products and unconverted syngas enter the gas bubbles and are collected at the top of the reactor. Liquid products are recovered from the suspending liquid using different techniques such as filtration, settling, hydrocyclones, and magnetic techniques. Cooling coils immersed in the slurry remove heat generated by the reaction. In a fixed bed reactor, the FT catalyst is held in a fixed bed contained in tubes or vessels within the reactor vessel. The syngas flowing through the reactor vessel contacts the FT catalyst contained in the fixed bed. The reaction heat is removed by passing a cooling medium around the tubes or vessels that contain the fixed bed. Multiphase reactors having a stationary catalyst phase are described in U.S. patent application Ser. No. 10/238,008, and now published as U.S. 20040048938 A1, filed Sep. 9, 2002, entitled "Gas Agitated Multiphase Reactor with Stationary Catalyst Solid Phase," which is incorporated by reference herein in its entirety.

In the FT process, $H_2$ and CO combine in a polymerization-like fashion to form hydrocarbon compounds having varying numbers of carbon atoms. An effluent stream 36 produced by FT process stage 34 comprises liquid compounds such as hydrocarbon liquids, including paraffins, oxygenates, and olefins having from about 5 to 100 or more carbon atoms in their molecules. A gas stream 38 comprising various components such as $H_2O$, $CO_2$, unreacted $H_2$ and CO, and light hydrocarbons also exits FT process stage 34. Gas stream 38 is passed to a separation process 40 to cool the components therein in one or more steps to one or more temperatures. In this manner, the condensable components (e.g., $H_2O$ and hydrocarbons) are separated from the non-condensable components (e.g., $H_2$ and CO), thereby forming a liquid product stream 42 and an FT gas effluent stream 44. Optionally, a portion of FT gas effluent stream 44, which comprises unconverted syngas and light hydrocarbons, may be recycled back to the inlet of the FT reactor or stage from which it came or sent to the inlet of any other FT reactor or stage. Furthermore, a portion of an FT gas effluent from another FT reactor may be recycled or sent to the inlet of FT process stage 34 or to the inlet of reactors therein. In the case where FT gas effluent stream 44 is recycled, it may be subjected to separation and/or purification processes before re-entering the reactor to where it is being recycled or sent to. At least a portion of stream 44 may also be utilized as fuel in various units of the GTL plant such as pre-heaters and gas turbines. Examples of suitable pre-heaters are an FT process pre-heater, a fractionator column preheater, and an FT product upgrading pre-heater. An example of a gas turbine is one that is employed to generate electricity for the GTL plant.

Liquid product stream 42 and effluent stream 36, which comprise hydrocarbons produced by the FT process, are passed to a product upgrading unit 46 to form various products. Product upgrading unit 46 may include, for example, a hydrotreater, a hydrocracker, and a separation unit such as a fractionator (not individually shown). In one possible embodiment of the product upgrading process, the hydrocarbons are subjected to hydrogenation in the hydrotreater, and then the products of the hydrotreater are sent to a fractionation tower. The heavy products exiting the bottom of the fractionation tower are then fed to a hydrocracker in the presence of $H_2$ to form a lower average molecular weight product. The $H_2$ required for product upgrading can be supplied by passing second hydrogen-rich stream 56 recovered from separation process 54 to product upgrading unit 46.

Various embodiments and various arrangements of hydrocracker, hydrotreater(s) and fractionator(s) in an FT product upgrading section, which are suitable for use in upgrading unit 46, are disclosed in the co-owned U.S. Patent Application entitled "Methods for Treating Organic Compounds and Treated Organic Compounds," filed Mar. 5, 2003, which is incorporated herein by reference in its entirety. Suitable conditions for hydrocracking and hydrotreating a hydrocarbon stream derived from Fischer-Tropsch synthesis are described below.

As used herein, "hydrotreating" means treating a hydrocarbon stream with hydrogen without making any substantial change to the carbon backbone of the molecules in the hydrocarbon stream. For example, hydrotreating a hydrocarbon stream comprising predominantly $H_2C=CH-CH_2-CH_2-CH_3$ would yield a hydrocarbon stream comprising predominantly $CH_3-CH_2-CH_2-CH_2-CH_3$. Hydrotreating a hydrocarbon stream derived from Fischer-Tropsch synthesis can take place with hydrotreating catalysts comprising at least one of the following metals: molybdenum (Mo), tungsten (W), nickel (Ni), palladium (Pd), platinum (Pt), ruthenium (Ru), iron (Fe), and cobalt (Co). Hydrotreating catalysts, such as those comprising Ni, Pd, Pt, Ni—W, Ni—Mo, Co—W, or Co—Mo, may be operated at a temperature of from about 320° F. to about 800° F. (from about 160° C. to about 425° C.). Additionally, other parameters such as the pressure and liquid hourly space velocity may be varied by one of ordinary skill in the art to effect the desired hydrotreating. Preferably, the hydrogen partial pressure is in the range of from about 100 psia to about 2,000 psia (from about 690 kPa to about 13,800 kPa). The liquid hourly space velocity is preferably in the range of from about 1 to about 10 $hr^{-1}$, more preferably from about 0.5 to about 6 $hr^{-1}$. Other specific hydrotreating conditions pertaining to ultra-low severity hydrotreating of a hydrocarbon stream derived from Fischer-Tropsch synthesis, which can be used for this application, are disclosed in the co-owned U.S. Patent Application entitled "Methods for Treating Organic Compounds and Treated Organic Compounds," filed Mar. 5, 2003.

As used herein, "hydrocracking" means splitting an organic molecule and adding hydrogen to the resulting molecular fragments to form two smaller hydrocarbons (e.g., $C_{10}H_{22}+H_2 \rightarrow C_4H_{10}$ and skeletal isomers $+C_6H_{14}$ and skeletal isomers). Because a hydrocracking catalyst can be active in hydroisomerization, there can be some skeletal isomerization during the hydrocracking step; therefore, isomers of the smaller hydrocarbons can be formed. Hydrocracking a hydrocarbon stream derived from Fischer-Tropsch synthesis preferably takes place over a hydrocracking catalyst comprising a noble metal or at least one base metal, such as platinum, cobalt-molybdenum, cobalt-tungsten, nickel-molybdenum, or nickel-tungsten, at a temperature of from about 550° F. to about 750° F. (from about 260° C. to about 400° C.) and at a hydrogen partial pressure of from about 500 psia to about 1,500 psia (from about 3,400 kPa to about 10,400 kPa). Specific hydrocracking conditions, which can be used for this application, pertaining to hydrocracking in conjunction with ultra-low severity hydrotreating of a FT stream are disclosed in the co-owned U.S. Patent Application entitled "Methods for Treating Organic Compounds and Treated Organic Compounds," filed Mar. 5, 2003.

In product upgrading unit 46, the hydrocarbons recovered from the hydrocracker are further refined to form products 48 such as naphtha, kerosene, diesel, and jet fuel, which are essentially free of sulfur. The diesel may be used to produce environmentally friendly, sulfur-free fuels and/or blending stocks for fuels by using as is or blending with higher sulfur fuels. A light off gas stream 50 comprising primarily $H_2$ also exits product upgrading unit 46. The light off gas can be used to meet fuel needs in the GTL plant. In particular, light off gas stream 50 may be passed to, for example, pre-heaters and gas turbines in the GTL plant as described previously. A portion of the light off gas, as indicated by stream 52, can also be recycled to CPOX reactor 30 to reduce the formation of carbon therein. Additional information regarding the introduction of $H_2$ to a CPOX reactor can be found in U.S. patent application Ser. No. 10/299,193, filed Nov. 19, 2002, entitled "The Production of Synthesis Gas from a Feed Stream Comprising Hydrogen," and now abandoned, which is incorporated by reference herein in its entirety.

In addition or as an alternative to being passed to product upgrading unit 46, second hydrogen-rich stream 56 may also be passed to one or more additional users of $H_2$ in the GTL plant. FIG. 1 depicts a stream 60 of second hydrogen-rich stream 56 being passed to a Fischer-Tropsch water stripper 62. The FT water stripper 62 is preferably employed in the GTL plant when FT process stage 34 includes a slurry-bubble reactor that produces a water-rich slurry containing hydrocarbons. A portion of the water-rich slurry may be removed from the slurry-bubble reactor and conveyed to FT water stripper 62 via stream 63. FT water stripper 62 uses a dry gas, e.g., $H_2$, to strip water from the water-rich slurry. The resulting water-reduced slurry can then be returned to the slurry-bubble reactor via stream 63. Suitable water stripping processes are described in U.S. patent application Ser. No. 10/034,452, filed Dec. 28, 2001, entitled "Water Stripping and Catalyst/Liquid Product Separation System", and now issued as U.S. Pat. No. 6,720,358, which is incorporated by reference herein in its entirety.

As shown in FIG. 1, another slip stream 64 of hydrogen rich stream 56 may be passed to an FT catalyst regeneration unit 66. The FT catalyst regeneration unit 66 is preferably employed when the activity of the FT catalyst has, due to a number of factors, deteriorated over time. A batch, semi-batch, or continuous regeneration process may be used that includes passing at least a portion of the catalyst in an FT reactor of FT process stage 34 to regeneration unit 66, regenerating the catalyst, and passing the catalyst back to the FT reactor, as indicated by stream 67. Within regeneration unit 66, the FT catalyst is exposed to a stream of $H_2$. Alternatively, the catalyst may be regenerated within the FT reactor by cycling between a reaction mode and a regeneration mode. In this situation, hydrogen rich stream 64 would be conveyed to the FT reactor rather than to a separate regeneration unit. Suitable FT catalyst regeneration processes are described in U.S. patent application Ser. No. 10/251,928, filed Sep. 20, 2002, entitled "Fischer-Tropsch Catalyst Regeneration" and now published as U.S. 20040059009 A1; U.S. patent application Ser. No. 60/412,598, filed Sep. 20, 2002, entitled "Slurry Activation and Regeneration of Fischer-Tropsch Catalyst with Carbon Monoxide Co-Feed" and now published as U.S. 20040127585 A1; and U.S. patent application Ser. No. 10/251,139, filed Sep. 20, 2002, entitled "Method and Apparatus for the Regeneration of Hydrocarbon Synthesis Catalysts," and now published as U.S. 20040059008 A1, each of which is incorporated by reference herein in its entirety.

FIG. 1 depicts hydrogen produced by a steam reformer being passed to a syngas feed stream of a Fischer-Tropsch process and to multiple users of hydrogen in the GTL plant. It is to be understood that the hydrogen can be introduced to different combinations of hydrogen users in different embodiments of the invention. For example, one embodiment may include passing the hydrogen to a water stripper and an FT catalyst regeneration process whereas another embodiment may include passing the hydrogen to a water stripper and a product upgrading process.

Figure 2:
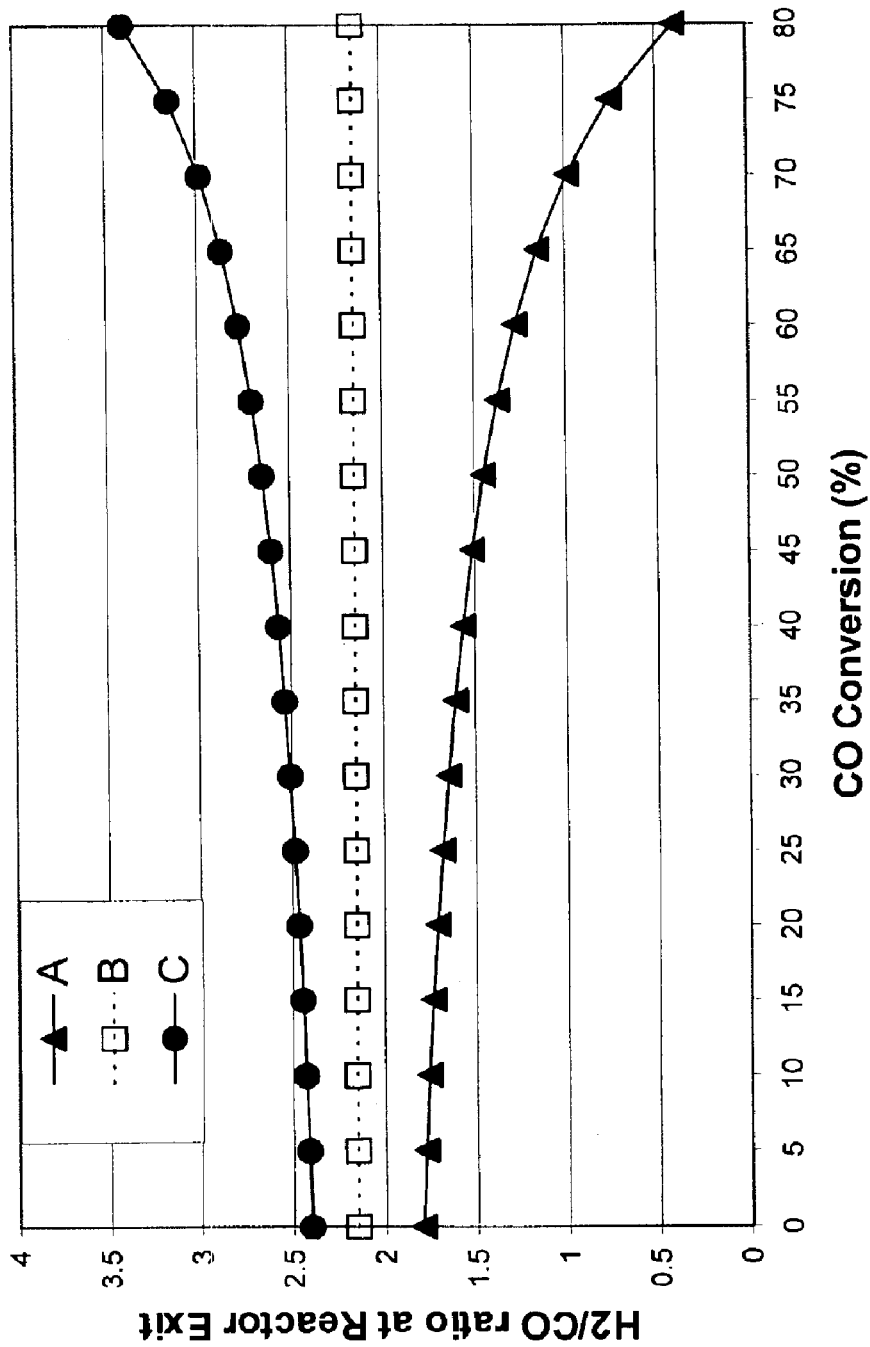
FIG. 2 is a graph in which the output $H_2/CO$ ratio of a Fischer-Tropsch reactor is plotted as a function of the conversion of carbon monoxide for three different feed $H_2/CO$ ratios.

FIG. 2 illustrates the effect of the $H_2/CO$ ratio at the reactor inlet and of the per pass CO conversion on the $H_2/CO$ ratio at the exit of a reactor using a cobalt-based catalyst. This example was made assuming a usage ratio of about 2.15, which is a typical expected usage ratio of a cobalt-based catalyst employed in a Fischer-Tropsch commercial scale reactor. It is to be understood that the usage ratio is the ratio of the net number of moles of $H_2$ reacted divided by the net number of moles of CO that reacted. In other words, the usage ratio is the number of moles of $H_2$ that disappeared from the system divided by the number of moles of CO that disappeared from the system. Plots A, B, and C represent the FT reaction being performed using three different $H_2/CO$ ratios in the syngas feed to an FT reactor. For each $H_2/CO$ ratio in the feed, the $H_2/CO$ ratio at the reactor exit is plotted as a function of the carbon monoxide conversion. The $H_2/CO$ ratio at the reactor exit decreases for plot A (feed $H_2/CO$ ratio=1.8) and increases for plot C (feed $H_2/CO$ ratio=2.4) as the conversion of carbon monoxide increases. In contrast, the $H_2/CO$ ratio remains constant for plot B, which has both a feed $H_2/CO$ ratio and an effluent $H_2/CO$ ratio of approximately 2.15. The usage ratio assumed in the example above is approximately 2.15, which is a typical expected usage ratio of a cobalt-based catalyst employed in a Fischer-Tropsh commercial scale reactor. As described previously, the present invention allows the feed $H_2/CO$ ratio to be adjusted to achieve a chosen usage ratio and thereby optimize the product composition.

While the preferred embodiments of the invention have been shown and described, modifications thereof can be made by one skilled in the art without departing from the spirit and teachings of the invention. Reactor design criteria, pendant hydrocarbon processing equipment, and the like for any given implementation of the invention will be readily ascertainable to one of skill in the art based upon the disclosure herein. The embodiments described herein are exemplary only, and are not intended to be limiting. Many variations and modifications of the invention disclosed herein are possible and are within the scope of the invention. Use of the term "optionally" with respect to any element of a claim is intended to mean that the subject element is required, or alternatively, is not required. Both alternatives are intended to be within the scope of the claim.

Accordingly, the scope of protection is not limited by the description set out above, but is only limited by the claims which follow, that scope including all equivalents of the subject matter of the claims. Each and every claim 1 is incorporated into the specification as an embodiment of the present invention. Thus the claims are a further description and are an addition to the preferred embodiments of the present invention. The discussion of a reference in the Description of Related Art is not an admission that it is prior art to the present invention, especially any reference that may have a publication date after the priority date of this application. The disclosures of all patents, patent applications and publications cited herein are hereby incorporated herein by reference, to the extent that they provide exemplary, procedural or other details supplementary to those set forth herein.

What is claimed is:

1. A process for producing hydrocarbons, comprising:
   (a) producing a synthesis gas stream in a syngas production process where the inlet materials to the syngas production process are substantially free of carbon dioxide and include molecular oxygen, and wherein the synthesis gas comprises primarily hydrogen and carbon monoxide;
   (b) forming a reactant-stream for a hydrocarbon synthesis process comprising at least a portion of the synthesis gas from step (a) wherein the ratio of hydrogen to carbon monoxide in the reactant-stream is less than that preferred for synthesis to hydrocarbons such that hydrogen is the lean component;
   (c) producing a hydrogen-rich stream by converting a feedstream comprising hydrocarbon gas and water in a steam reformer, wherein the feedstream is substantially free of molecular oxygen;
   (d) adding an amount of said hydrogen-rich stream to the reactant-stream to form an adjusted reactant-stream that has a hydrogen to carbon monoxide ratio more desirable for hydrocarbon synthesis; and (e) catalytically converting the adjusted reactant-stream from step (d) in a synthesis reaction to produce hydrocarbons.

2. The process according to claim 1, wherein the step (e) of catalytically converting the adjusted reactant-stream comprises Fischer-Tropsch synthesis conducted in one or more Fischer-Tropsch reactors and wherein at least one Fischer-Tropsch reactor produces an FT gas effluent comprising un-reacted synthesis gas and wherein FT gas effluent exiting a Fischer-Tropsch reactor is optionally subjected again to catalytic conversion conditions for Fischer-Tropsch synthesis in a Fischer-Tropsch reactor.

3. The process according to claim 2 wherein the reactant-stream of step (b) comprises FT gas effluent.

4. The process according to claim 2 wherein the FT gas effluent from one Fischer-Tropsch reactor is directed to a second Fischer-Tropsch reactor.

5. The process according to claim 4 wherein a second reactant-stream is formed for the second Fischer-Tropsch reactor and the second reactant-stream comprises at least one of:
(a) synthesis gas from the syngas production process; and
(b) the FT effluent from the one Fischer-Tropsch reactors; and the process further comprises adding an amount of said hydrogen-rich stream to said second reactant-stream to create a second adjusted reactant-stream that is more preferable for Fischer-Tropsch synthesis.

6. The process according to claim 2 wherein at least a portion of the FT gas effluent is recycled back into the same Fischer-Tropsch reactor from which it exited.

7. The process according to claim 1 further comprising the step of upgrading the hydrocarbons produced in step (e) into hydrocarbon products.

8. A process for producing hydrocarbons, comprising:
(a) producing a synthesis gas stream in a catalytic partial oxidation syngas production process where the inlet materials include molecular oxygen, and wherein the synthesis gas comprises primarily hydrogen and carbon monoxide;
(b) producing a hydrogen-rich stream by converting a feedstream comprising hydrocarbon gas and water in a steam reformer, wherein the feedstream is substantially free of molecular oxygen,
(c) subjecting at least a portion of the hydrogen-rich stream from the steam reformer in step (b) to a water-gas-shift reaction to increase the hydrogen concentration thereof, thereby forming an enriched hydrogen-rich stream;
(d) producing hydrocarbons and water in a synthesis reaction system by catalytic conversion of the synthesis gas from step (a) and at least one of the hydrogen-rich stream from step (b) and enriched hydrogen-rich stream in step (c), wherein the synthesis reaction system comprises multiple Fischer-Tropsch synthesis reactors;
(e) within the synthesis reaction system of step (d),
(1) forming a first reactant-stream for a first Fischer-Tropsch synthesis reactor wherein the first reactant-stream comprises at least one of:
(i) synthesis gas from the catalytic partial oxidation syngas production process of step (a);
(ii) recycled effluent gas from the first Fischer-Tropsch reactor; and
(iii) effluent gas from a second Fischer-Tropsch reactor;

(2) adding an amount of at least one of said hydrogen-rich stream and enriched hydrogen-rich stream to the first reactant-stream to form a first adjusted reactant-stream to the first Fischer-Tropsch reactor to adjust the hydrogen to carbon monoxide ratio of the first reactant-stream to a more desirable ratio for hydrocarbon synthesis;

(f) regenerating the catalyst used in the catalytic conversion of step (d) with hydrogen from at least one of the hydrogen-rich stream from step (b) and the enriched hydrogen-rich stream from step (c); and (h) upgrading the hydrocarbons produced in step (d) into hydrocarbon products with hydrogen from at least one of the hydrogen-rich stream from step (b) and the enriched hydrogen-rich stream from step (c).

9. The process according to claim 8 further comprising a separation process to remove at least a portion of carbon dioxide content from at least one of the hydrogen-rich stream and enriched hydrogen-rich stream prior to the step (e)(2) of adding an amount of at least one of said hydrogen-rich stream and enriched hydrogen-rich stream.

10. The process according to claim 9 further including a separation process to increase the hydrogen concentration of at least one of the hydrogen-rich stream and enriched hydrogen-rich stream to form a second hydrogen-rich stream, wherein the separation process comprises at least one of: a membrane separation process; a pressure swing adsorption process; and a cryogenic separation process; and wherein the second hydrogen-rich stream is directed to the process steps (e) and (f).

11. The process according to claim 10 further including the step of stripping water from the Fischer-Tropsch synthesis reaction using the enriched hydrogen-rich stream to enhance the productivity of the Fischer-Tropsch synthesis reaction system.

12. The process according to claim 8 further including a separation process to increase the hydrogen concentration of at least one of the hydrogen-rich stream and enriched hydrogen-rich stream to form a second hydrogen-rich stream, wherein the separation process comprises at least one of: a membrane separation process; a pressure swing adsorption process; and a cryogenic separation process; and wherein the second hydrogen-rich stream is directed to the process steps (e) and (f).

13. The process according to claim 8 further including the step of stripping water from the Fischer-Tropsch synthesis reaction to enhance the productivity of the Fischer-Tropsch synthesis reaction system.

14. The process according to claim 8 wherein the step (f) of regenerating catalyst is performed intermittently.

15. The process according to claim 8 further including within the synthesis reaction system the steps of:
(a) forming a second reactant-stream for the second Fischer-Tropsch synthesis reactor wherein the second reactant-stream comprises at least two of:
(1) synthesis gas from the catalytic partial oxidation syngas production process of step (a);
(2) recycled effluent gas from the first Fischer-Tropsch reactor; and
(3) effluent gas from a second Fischer-Tropsch reactor; and
(b) adding an amount of at least one of said hydrogen-rich stream and enriched hydrogen-rich stream to the second reactant-stream to form a second adjusted reactant-stream to the second Fischer-Tropsch reactor to adjust the hydrogen to carbon monoxide ratio of the second reactant-stream to more desirable ratio for hydrocarbon synthesis.

16. The process according to claim 8 further including a separation process to increase the hydrogen concentration of at least one of the hydrogen-rich stream and enriched hydrogen-rich stream to form a second hydrogen-rich stream, wherein the separation process comprises at least one of: a membrane separation process; a pressure swing adsorption process; and a cryogenic separation process; and wherein the second hydrogen-rich stream is directed to the process step (h).

17. The process according to claim 8 wherein the inlet materials to the catalytic partial oxidation syngas production process are substantially free of carbon dioxide.

18. A process for producing hydrocarbons, comprising:
- (a) producing a synthesis gas stream in a syngas production process comprising a partial oxidation reactor where the inlet materials to the syngas production process include molecular oxygen, and wherein the synthesis gas comprises primarily hydrogen and carbon monoxide;
- (b) creating a hydrogen-rich stream by converting a feedstream comprising hydrocarbon gas and water in a steam reformer to form said hydrogen-rich stream, wherein the feedstream to the steam reformer is substantially free of molecular oxygen;
- (c) forming an enriched hydrogen-rich stream by subjecting at least a portion of the hydrogen-rich stream from step (b) to a water-gas-shift reaction to convert some CO with water to $CO_2$ and $H_2$ such that the enriched hydrogen-rich stream comprises more $H_2$ and $CO_2$ than the hydrogen-rich stream;
- (d) forming a concentrated hydrogen-rich stream by feeding a slipstream of said enriched hydrogen-rich stream from step (c) to a first separation process comprising an amine system or a pressure-swing adsorption unit, so as to remove $CO_2$ from said slipstream of enriched hydrogen-rich stream; wherein the concentrated hydrogen-rich stream has a lower $CO_2$ concentration than the enriched hydrogen-rich stream;
- (e) introducing a first portion of the hydrogen-rich stream to the synthesis gas stream to form an adjusted reactant-stream that has a hydrogen to carbon monoxide ratio more desirable for hydrocarbon synthesis, wherein the first portion of the hydrogen-rich stream includes at least a portion of the concentrated hydrogen-rich stream obtained from step (d);
- (f) catalytically converting the adjusted reactant-stream from step (e) in a synthesis reaction system to produce hydrocarbons and water in a synthesis reaction system by catalytic conversion of the synthesis gas and wherein the synthesis reaction system comprises one or more Fischer-Tropsch synthesis reactor stages and optionally further comprises a process for stripping water or a process for regenerating a Fischer-Tropsch catalyst or both;
- (g) forming a second hydrogen-rich stream by feeding another slipstream of said enriched hydrogen-rich stream from step (c) and optionally a slipstream of the hydrogen-rich stream from step (b) to a second separation process comprising at least one process selected from the group consisting of a membrane separation process, a pressure swing adsorption process, and a cryogenic separation process; wherein the second hydrogen-rich stream has a higher $H_2$ concentration than the enriched hydrogen-rich stream; and
- (h) passing a second portion of the hydrogen-rich stream to one or more hydrogen users, wherein the second portion of the hydrogen-rich stream comprises at least a portion of the second hydrogen-rich stream from step (g); and further wherein the hydrogen users include the process for stripping water from the synthesis reaction system in step (f), the process for regenerating a Fischer-Tropsch catalyst from the synthesis reaction system in step (f), and a process for upgrading or refining the hydrocarbons recovered after step (f) from the synthesis reaction system into hydrocarbon products.

19. The process according to claim 18 wherein the first portion of said hydrogen-rich stream further comprises at least one stream selected from the group consisting of a slipstream of the hydrogen-rich stream from step (b) and a slipstream of the enriched hydrogen-rich stream from step (c).

20. The process according to claim 18 wherein the second portion of said hydrogen-rich stream further comprises at least one stream selected from the group consisting of a slipstream of the hydrogen-rich stream from step (b) and a slipstream of the enriched hydrogen-rich stream from step (c); and further wherein step (h) comprises passing the second portion of said hydrogen-rich stream to one or more hydrogen users from the process for regenerating a Fischer-Tropsch catalyst, and the process for upgrading or refining the hydrocarbons recovered after step (f).

21. The process according to claim 18 wherein the inlet materials to the syngas production process are substantially free of carbon dioxide.

* * * * *